United States Patent [19]

Hamano et al.

[11] Patent Number: 4,497,291
[45] Date of Patent: Feb. 5, 1985

[54] FULL ECONOMIZER FOR VEHICLES

[75] Inventors: Isao Hamano; Akira Morishita; Yoshifumi Akae; Toshinori Tanaka; Kiyoshi Yabunaka, all of Himeji, Japan

[73] Assignee: Mitsubishi Denki Kabushiki Kaisha, Tokyo, Japan

[21] Appl. No.: 557,224

[22] Filed: Nov. 30, 1983

[30] Foreign Application Priority Data

Dec. 2, 1982 [JP] Japan .................. 57-183865

[51] Int. Cl.³ .............................................. F02D 35/00
[52] U.S. Cl. .................... 123/179 BG; 123/179 G; 123/19 E; 123/19 DC
[58] Field of Search ........ 123/179 BG, 179 B, 179 G, 123/179 R, 19 E, 19 DC, 19 DB, 332, 333, 334

[56] References Cited

U.S. PATENT DOCUMENTS

| | | | |
|---|---|---|---|
| 3,593,697 | 7/1971 | Ciolli | 123/179 BG |
| 3,872,316 | 3/1975 | Kurii et al. | 123/179 B |
| 3,941,204 | 3/1976 | Kurii et al. | 123/179 B |
| 3,942,024 | 3/1976 | Ingham | 290/38 R |
| 4,192,279 | 3/1980 | Maisch et al. | 123/333 |
| 4,198,945 | 4/1980 | Eyermann | 123/179 B |
| 4,331,880 | 5/1982 | Dittman et al. | 123/179 BG |
| 4,372,262 | 2/1983 | Kaniut | 123/179 BG |
| 4,421,082 | 12/1983 | Katayose et al. | 123/179 G |
| 4,453,566 | 6/1984 | Ueda et al. | 123/179 BG |
| 4,454,843 | 6/1984 | Uchida et al. | 123/179 BG |

Primary Examiner—William A. Cuchlinski, Jr.
Attorney, Agent, or Firm—Wenderoth, Lind & Ponack

[57] ABSTRACT

A fuel economizer for a vehicle for automatically stopping the engine of the vehicle a predetermined time after detecting that the transmission of the vehicle is in a neutral position, the cooling water temperature of the engine is in a predetermined range and that the clutch pedal of the vehicle is not trodden, and for automatically starting the engine when detecting that the clutch pedal is completely trodden, the R.P.M. of the engine is less than a predetermined value and that the transmission is not in a neutral position.

3 Claims, 3 Drawing Figures

FULL ECONOMIZER FOR VEHICLES

BACKGROUND OF THE INVENTION

1. Field of the Invention

The present invention relates to a fuel economizer for vehicles, and more particularly to a fuel economizer which minimizes fuel consumption by stopping an engine during the coasting of a vehicle.

2. Description of the Prior Art

Heretofore, a device of the specified type has been as shown in FIG. 1. Referring to the figure, numeral 1 designates a battery for a vehicle, and numeral 2 a main switch which is closed during the running of the vehicle. Numeral 3 designates a neutral switch which is closed upon detecting the neutral position of a transmission, and numeral 4 a delay relay. These components 3 and 4 are connected in series with the main switch 2. A governor switch 5 responds to the speed of the vehicle, and it is closed during the running of the vehicle. Shown at numeral 6 is an ignition circuit for an engine. The circuit 6 includes therein an ignition circuit relay 7 operating in response to the delay relay 4, an ignition switch 8, an ignition coil 9, an ignition plug 10, and an ignition circuit relay 11. Numeral 12 indicates a clutch pedal, while numeral 13 indicates a clutch actuating switch which is closed when the clutch pedal 12 is trodden. A starter control relay 14 is principally composed of magnet coils 14a, 14b and a spring 14c. Shown at numeral 15 is a starter.

In the above construction, the main switch 2 and the governor switch 5 are closed during the running of the vehicle. In a case where the vehicle runs at a high speed on a flat road or runs on a gentle downward slope, when the transmission is shifted to the neutral position for coasting, the neutral switch 3 is closed, and the delay relay 4 is closed after a predetermined time. In response to the closure of the delay relay 4, the ignition circuit relay 7 operates to open its contact, so that the ignition circuit 6 is deenergized to automatically stop the engine. Next, in a case where the coasting is discontinued, to start the engine; when the clutch pedal 12 is trodden in order to bring the gear of the transmission into mesh, the switch 13 is closed, and the starter control relay 14 is connected to the vehicular battery 1 through the delay relay 4, so that the starter 15 is energized to urge the engine to rotate. In addition, the closure of the switch 13 results in closing the contact of the ignition circuit relay 11, so that the ignition circuit 6 is reset to start the engine. Further, when the clutch pedal 12 is released after bringing the gear of the transmission into mesh, the delay relay 4 is turned "off", and the ignition circuit relay 7 is reset and turned "on", so that the engine continues to rotate, and the starter 15 stops. The delay relay 4 is disposed in order to prevent the engine from stopping when the transmission in once set at the neutral position for the mere shift thereof, not for the coasting.

With the prior-art device, however, when the vehicle is stopped after the coasting, the delay relay 4 is deenergized to disable the starter control relay 14 to be supplied with current, so that the starter 15 needs to be started with a key switch, not shown, when the vehicle is restarted. This has led to the disadvantage that the manipulation is troublesome.

SUMMARY OF THE INVENTION

The present invention has been made in order to eliminate the disadvantage of the prior art, and has for its object to provide a fuel economizer for vehicles which is readily restarted even when the vehicle has been stopped from a coasting condition and which can therefore reduce fuel consumption while providing simple operation.

In one aspect of performance of the present invention, a fuel economizer comprises control means for automatically stopping the engine of an automobile a predetermined time after the detecting that the transmission is in neutral position and that the cooling water temperature of the engine is in a predetermined range and that the clutch pedal is not trodden, and for automatically starting the engine when detecting that the clutch pedal is completely trodden, that the R.P.M. of the engine is less than a predetermined value and that the transmission is not in the neutral position.

DESCRIPTION OF THE PREFERRED EMBODIMENT

Figure 1:
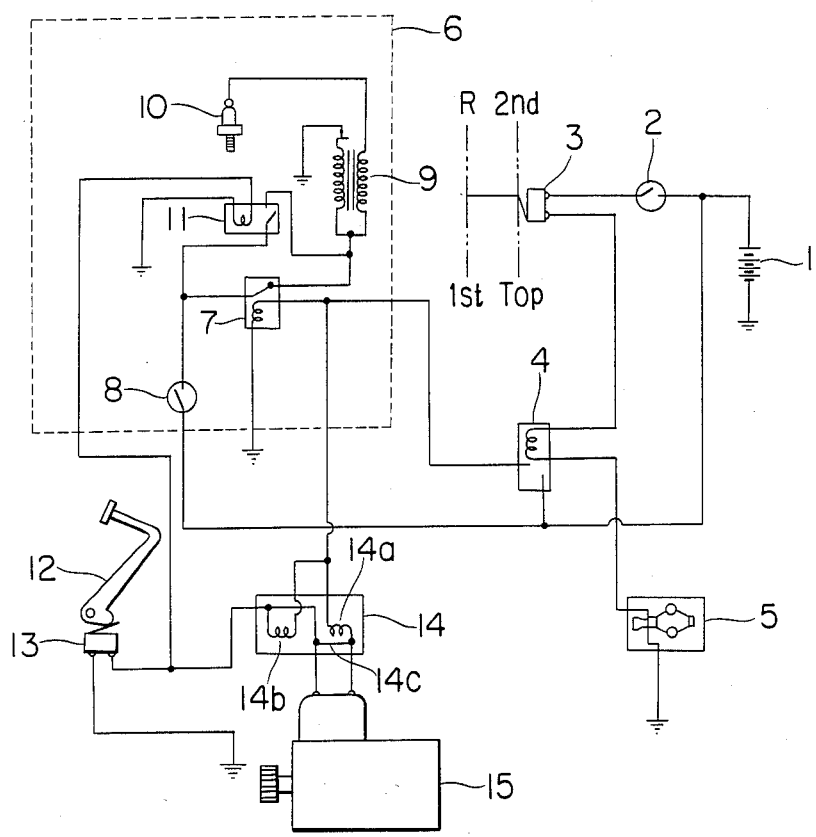
FIG. 1 is an arrangement diagram of a prior-art fuel economizer.
Figure 2:
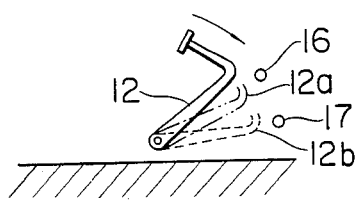
FIG. 2 is a diagram for explaining the operation of a clutch portion in a fuel economizer according to the present invention.
Figure 3:
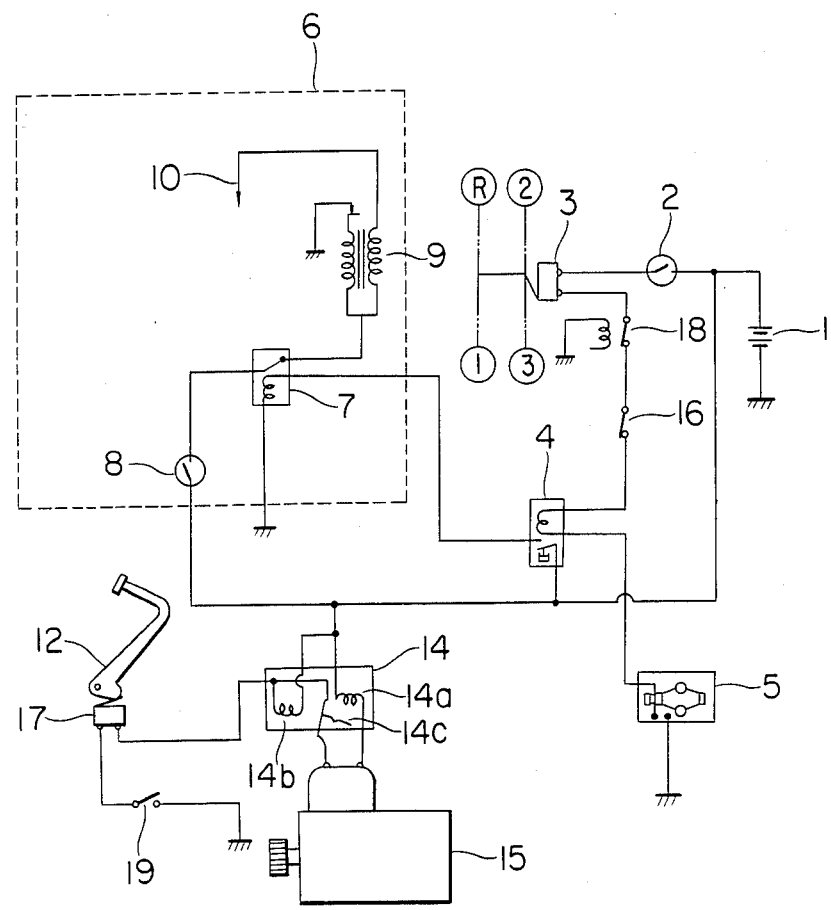
FIG. 3 is an arrangement diagram of the fuel economizer.

Now, an embodiment of the present invention will be described with reference to the drawings. Referring to FIGS. 2 and 3, numeral 16 designates a normally-closed first clutch switch which is opened when the clutch pedal 12 is trodden even slightly, numeral 17 a normally-open second clutch switch which is closed when the clutch pedal 12 is fully trodden, numeral 18 a normally-closed water temperature sensor which is opened when the cooling water temperature of the engine is outside a predetermined temperature range, and numeral 19 an engine revolution sensor which is closed when the rotational speed is less than a predetermined value. These switches and sensors 16-19 and the neutral switch 3 constitute a control means. This control means is constructed of a first circuit in which the neutral switch 3, water temperature sensor 18 and first clutch switch 16 are connected in series so as to operate the delay relay 4, and a second circuit in which the second clutch switch 17 and engine revolution sensor 19 are connected in series so as to start the starter 15. The ignition circuit relay 11 is not required. In addition, the starter control relay 14 is directly connected to the battery 1. The remaining construction is the same as in FIG. 1.

In the above arrangement, when the ordinary running of the automobile has been shifted to the coasting state by shifting the transmission to the neutral position, the neutral switch 3 is closed. When the water temperature falls within the prescribed temperature range owing to the sufficient warming-up of the engine, the water temperature sensor 18 is closed. When the clutch pedal 12 is in the position of the solid lines in FIG. 2, the first clutch switch 16 is closed. In addition, since the automobile is running, the main switch 2 and the governor switch 5 are also closed, so that the delay relay 4 is energized to turn "on". In consequence, a predetermined time set by the delay relay 4 after the closure of the neutral switch 3, the ignition circuit relay 7 turns "off", whereby the engine is automatically stopped.

Next, in a case where the coasting is discontinued, to start the engine, the clutch pedal 12 is trodden, and the transmission is brought into mesh in a position other than the neutral position. Therefore, the neutral switch 3 is opened, and the delay relay 4 is turned "off", so that the ignition circuit relay 7 turns "on" to reset the ignition circuit 6. In addition, the second clutch switch 17 is closed, and the engine revolution sensor 19 is also closed as the engine remains stopped, so that the starter control relay 14 is connected to the vehicular battery 1, and the starter 15 is energized, whereby the engine is started.

Also, in a case where the automobile has been stopped directly after coasting with the transmission set at the neutral position; when the clutch pedal 12 is fully trodden, automatic starting can be effected without hindrance similarly to the above case of the starting. In FIG. 2, symbol 12a denotes a position in which the clutch pedal 12 is immediately before being half clutched, while symbol 12b denotes a position in which the clutch pedal 12 is completely trodden.

With the prior art, in case of stopping the engine, the ignition circuit relay 7 is turned "off" to deenergize the ignition coil 9. In this case, there is the fear that fuel will flow in from an idling port at the stoppage of the engine and that the unburnt gas will be emitted to explode in a catalyst portion at the restarting. However, when an automatic fuel shutoff device is installed which shuts off (with a shutoff valve) or reduces the fuel in a carburetor in association with the operation of the delay relay 4, the fuel flow is automatically cut at the point of time at which the vehicle has shifted to the coasting. Therefore, the fuel cost and the safety of the device are improved.

As described above, according to the present invention, subject to the fact that the transmission is in the neutral position, that the cooling water temperature of the engine is in a predetermined range and that the clutch operation is not executed, the coasting of the vehicle is detected and the engine is automatically stopped, whereby fuel consumption can be economized. Moreover, subject to the fact that the transmission is not in the neutral position, that the rotational speed of the engine is less than a predetermined value (namely, zero) and that the clutch operation has been completely executed, the automatic starting of the engine is effected, and the restarting can be effected without hindrance even in the case where the automobile has been stopped after coasting, whereby the manipulation of the fuel economizer is enhanced.

What is claimed is:

1. A fuel economizer for vehicles comprising a first clutch switch which detects a tread of a clutch pedal of the automobile, a second clutch switch which detects completion of the tread of the clutch pedal, a neutral switch which detects a neutral position of a transmission, a water temperature sensor which detects that a cooling water temperature of an engine falls within a predetermined range, an engine revolution sensor which detects that a rotational speed of the engine is less than a predetermined value, and a control means for automatically stopping the engine a predetermined time after signal generation of said neutral switch when supplied with respective detection signals of said neutral switch and said water temperature sensor and not supplied with a detection signal of said first clutch switch, and for automatically starting the engine when supplied with respective detection signals of said second clutch switch and said engine revolution sensor and not supplied with the detection signal of said neutral switch.

2. A fuel economizer for vehicles as defined in claim 1, wherein said control means comprises a first circuit in which said neutral switch, said water temperature sensor and said first clutch switch are connected in series so as to operate a delay relay for controlling an operation of an ignition circuit, and a second circuit in which said second clutch switch and said engine revolution sensor are connected in series so as to start a starter.

3. A fuel economizer for vehicles as defined in claim 2, wherein said first circuit of said control means comprises a main switch and a governor switch which are closed during running of the vehicle and which are connected in series.

* * * * *